Dec. 30, 1924.     1,521,326
C. SCHRAMM ET AL
RELIEVING MACHINE
Filed Nov. 28, 1921

Inventors
Carl Schramm &
Paul F. Vokal,
By Wayne B Wells
Attorney

Patented Dec. 30, 1924.

1,521,326

UNITED STATES PATENT OFFICE.

CARL SCHRAMM, OF WEST HARTFORD, AND PAUL F. VOKAL, OF HARTFORD, CONNECTICUT, ASSIGNORS TO PRATT & WHITNEY COMPANY, OF NEW YORK, N. Y., A CORPORATION OF NEW JERSEY.

RELIEVING MACHINE.

Application filed November 28, 1921. Serial No. 518,336.

*To all whom it may concern:*

Be it known that we, CARL SCHRAMM and PAUL F. VOKAL, citizens of the United States, residing at West Hartford and Hartford, respectively, in the county of Hartford and State of Connecticut, have invented certain new and useful Improvements in Relieving Machines, of which the following is a specification.

This invention relates to relieving machines and particularly to relieving machines for shaping milling cutter blanks to cut predetermined contours.

One object of our invention is to provide a machine that shall form a cutter blank, under the control of a former member, to cut a contour similar in shape to the contour of the former member but differing in length and breadth therefrom.

Another object of our invention is to provide a machine for shaping a milling cutter blank that shall be provided with a cutting tool for engaging the blank, a former pin for engaging the former member, said former pin being similar in shape to the cutting tool but differing in size therefrom according to the difference in size between the former contour and the contour cut by the finished blank, and means controlled by the former member and the former pin for operating the cutting tool to shape the blank to cut a contour similar in shape to the contour of the former member but differing in size therefrom.

Another object of our invention is to provide a machine for shaping a milling cutter blank, having either helical or straight teeth, that shall comprise a cutting tool for engaging the blank, a former pin engaging the former member and so connected to the cutting tool as to effect movement of the cutting tool in proportion to any movement effected by it, and means controlled by the former member and the former pin for so operating the cutting tool as to shape the cutter blank to a contour similar in shape to the contour of the former member but differing in size therefrom.

In many machines now in service, it is customary to mount the cutting tool and the former pin on a longitudinally movable carriage. The cutting tool is supported on the carriage by a relieving slide which is so operated as to relieve the teeth on the blank. During the longitudinal movement of the former pin along the former member and the cutting tool along the blank, the former pin follows the contour of the former member and accordingly so controls the transverse movement of the cutting tool as to cut the blank to different diameters in accordance with the contour of the former member.

In a machine constructed in accordance with our invention, the former pin is so connected to the cutting tool as to effect a proportional movement of the cutting tool for any movement of the former pin. Preferably, the former pin is connected to the cutting tool by means of a pantograph mechanism. Such mechanism permits the cutting tool to shape the milling cutter blank to cut a contour differing not only in length but also in breadth from the contour of the former member engaged by the former pin. The pantograph mechanism is jointly supported by the stationary support for the former member and the carriage which supports the cutting tool. The former pin is mounted on the pantograph mechanism. The relative position of the former pin and the points of support for the pantograph mechanism, in a well known manner, determines the amount of movement of the cutting tool in accordance with any movement by the former pin. The former pin is constructed similar in shape to the cutting tool but differs in size therefrom according to the difference in size between the contour of the former member and the contour which is to be cut by the finished blank. Moreover, a machine constructed in accordance with out invention is adapted not only to shape and relieve straight teeth on a blank to cut any predetermined contour but also to shape and relieve helical teeth on a blank.

The pantograph mechanism utilized in a machine constructed in accordance with our invention makes it possible to compensate for any changes in size of the cutter blank that may be effected during the hardening process. The pantograph mechanism may be so set as not only to compensate for changes in length but also for changes in diameter of the blank that may be effected during the hardening process. Moreover, any errors in contour of the former member are reduced by means of the pantograph mechanism. The former pin, which differs in size from the cutting tool according to the difference in size between the former contour and the contour to be cut by the finished blank, is of such size as to render a more stable engagement between the former pin and the former member. The former pin is able to follow sharp curves more easily in a machine wherein the contour of the former member varies not only in length but also in breadth from the contour to be cut by the finished blank.

In machines heretofore constructed having enlarged former members no account was taken of the size of the former pin relative to the size of the cutting tool. Upon consideration, it will be apparent that the size of the former pin relative to the size of the cutting tool must vary in accordance with the size of the former contour relative to the size of the contour to be cut by the finished blank. Moreover, the former pin should be constructed similar in shape to the shape of the cutting tool.

Figure 1:
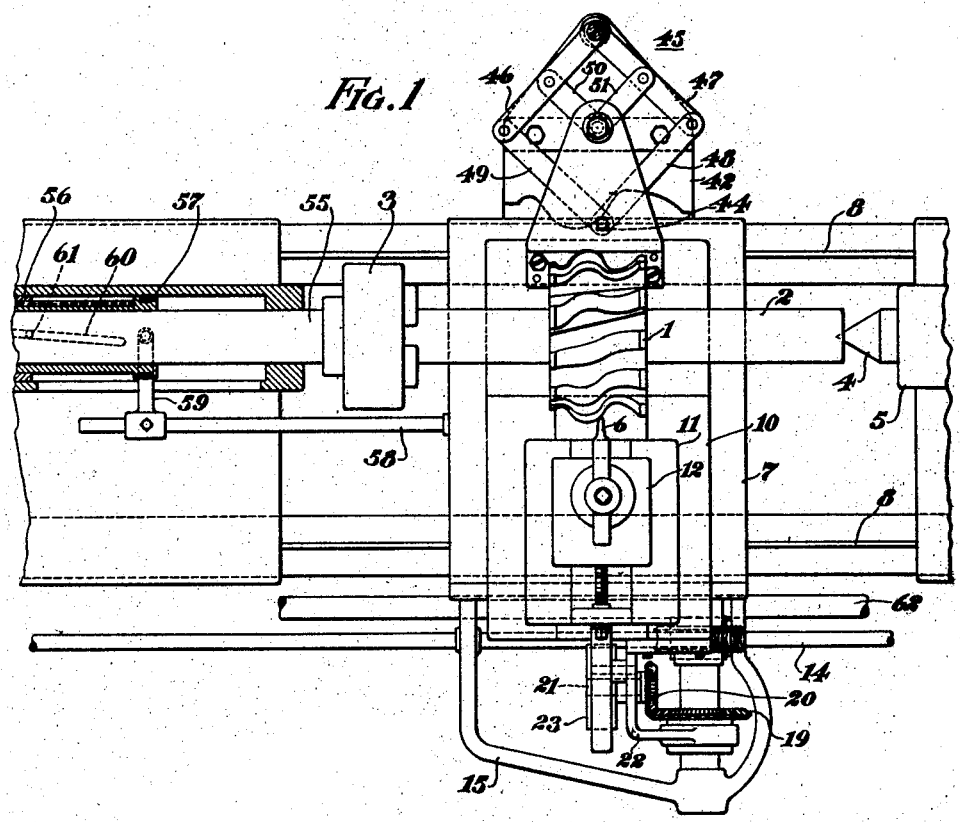
Figure 1 is a partial diagrammatic plan view of a machine constructed in accordance with our invention.
Figure 2:
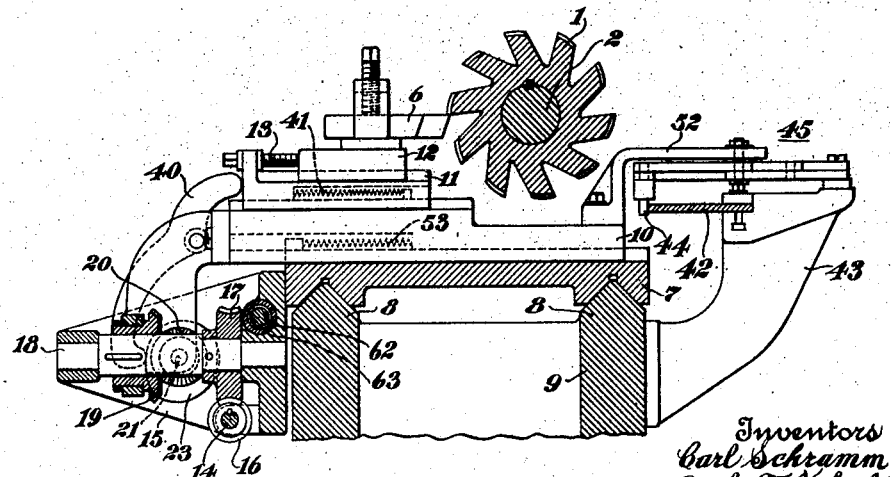
Fig. 2 is a sectional elevational view of the machine shown in Fig. 1.

Referring to the drawing, a cutter blank 1 is shown mounted on a mandrel 2. The mandrel 2 is supported by a chuck 3 and a center pin 4 which is mounted in a tailstock 5. A cutting tool 6, which is adapted to engage the cutter blank 1, is mounted on a carriage 7. The carriage 7 is movable along ways 8 on the frame 9 of the machine. A transversely movable slide 10 is directly mounted on the carriage 7. The slide 10 serves to vary the position of the cutting tool 6, in a manner to be hereinafter set forth, to cut the blank to different diameters. A relieving slide 11 is mounted on the slide 10 and a tool slide 12 which directly supports the cutting tool 6, is mounted on the relieving slide 11. A screw member 13, which is mounted on the relieving slide 11, is provided for initially adjusting the position of the tool slide 12 and the cutting tool 6.

A suitable mechanism mounted on the carriage 7 and the slide 10 for effecting relieving movements of the relieving slide 11 in timed relation to the rotation of the blank 1. A shaft 14, which extends longitudinally along the machine, is provided with bearings in a bracket 15. The bracket 15 projects from the carriage 7. The shaft 14 is driven in timed relation to the spindle rotation in any suitable manner, in order to effect relieving movements of the tool in accordance with the blank rotation. A worm member 16 is keyed to, but slidably mounted on, the shaft 14 in order to rotate in accordance with the rotation of the shaft 14 and to effect longitudinal movement in accordance with the movement of the carriage 7. The worm member 16 meshes with a worm wheel 17 which is mounted on a short shaft 18. The shaft 18 is mounted on the bracket 15 which is supported by the carriage 7. A bevel gear wheel 19, which is slidably mounted on the shaft 18, meshes with a bevel gear wheel 20. The gear wheel 20 is mounted on a short shaft 21. The shaft 21 is provided with a bearing in a bracket 22 which projects from the slide 10. The bracket 22 engages a hub portion of the bevel gear wheel 19 in order to effect movement of such gear wheel along the shaft 18 in accordance with the movement of the slide 10. The bevel gear wheel 19 is splined to the shaft 18 in order to rotate in accordance with the rotation of the shaft 14. The shaft 21 carries a cam member 23 which is adapted to oscillate a lever 40. The lever 40 is pivoted in any suitable manner on the slide 10 with the upper end thereof engaging the relieving slide 11. A spring member 41 is provided for holding the slide 11 in engagement with the end of the lever 40. In the above construction, it is apparent the rotation of the cam member 23 effects oscillation of the lever 40 to effect relieving movements of the slide 11 and the cutting tool 6. The shaft 14 is driven in timed relationship with the cutter blank so that normally for any given position of the carriage, the cam member 23 is given as many complete revolutions for each revolution of the blank as the blank has teeth.

A former member 42, which is similar in shape to the contour to be cut by the finished blank, is suitably mounted on a bracket 43. The bracket 43 projects from the frame 9 of the machine. Although the contour of the former member 42 is similar in shape to the contour desired to be cut by the cutter blank, its length and breadth are different from the contour desired to be cut by the finished blank. A former pin 44, which is similar in shape to the cutting tool 6, is mounted on a pantograph mechanism 45. Although the former pin 44 is similar in shape to the shape of the cutting tool 6, the size of such pin should vary in accordance with the variation in size between the former contour and the contour to be cut by the finished blank.

The pantograph mechanism, which supports the former pin 44, is of a well known construction and operates in a well known manner. The mechanism comprises lever arms 46 to 49, inclusive, which are pivotally joined together in the usual manner. The junction point of the levers 46 and 47 is pivotally supported on the bracket 43 which carries the former member 42. The former pin 44 is connected to the mechanism at the junction point of the levers 48 and 49. Two levers 50 and 51 are respectively pivotally connected to the levers 46 and 47. The levers 50 and 51 are pivotally connected to a bracket 52 which projects from the slide 10. A spring member 53 is provided for pressing the slide 10 towards the rear. Thus, the former pin 44 is held in engagement with the former member 42.

In the above construction, it is apparent the former pin 44 effects a movement relative to the movement of the junction point of the levers 50 and 51 with the bracket 52, that is proportional to the length of either of the levers 46 and 47 relative to the distance from the point of connection of the levers 46 and 47 to the points where the levers 50 and 51 are connected to the levers 46 and 47. The cutting tool 6 is moved in accordance with the movement of the bracket 52 and accordingly the cutting tool may be moved at any desired rate relative to the movement of the former pin 44. The pantograph mechanism 45 is adjusted in accordance with the difference in size between the former contour and the contour which is desired to be cut by the finished blank. Preferably, the pantograph mechanism is varied by adjusting the lengths of the levers 50 and 51 and the point of connection of such levers to the levers 46 and 47.

In order to effect relieving movements of the cutting tool 6 in accordance with helicoidal cutting faces on the blank 1 provision is made for supplementally rotating the blank in proportion to the longitudinal movement of the tool. In the illustrated construction, the chuck 3 which engages the mandrel 2, is mounted on a spindle 55. Power for rotating the spindle 55 is supplied through a sleeve 56 which has splined engagement with a smaller sleeve 57. A rod 58 and a forked lever 59 are provided for forcing the sleeve 57 to move longitudinally with the carriage 7. The spindle 55 is fixed against longitudinal movement and extends into the sleeve 57. The sleeve 57 is provided with a helical groove 60 having the same longitudinal pitch as the helical cutting faces of the blank. A pin 61 on the spindle 55 projects into the groove 60 thus transmitting power from the sleeve 57 to the spindle. It will be seen that the above construction permits the spindle to be driven by means of the sleeve 56 but that the spindle is supplementally rotated in proportion to the longitudinal movement of the carriage. This supplemental movement is just sufficient to enable the tool to properly engage the helicoidal teeth. In case the teeth of the blank are not inclined relative to the blank axis, it is apparent the groove 60 in the sleeve 57 will be varied in accordance therewith.

A screw shaft 62 is provided for effecting feeding operation of the carriage 7 in any suitable manner. Preferably, a nut 63, which is connected to the bracket 15, is engaged by the shaft 62 to effect movement of the carriage. The shaft 62 may be operated in any suitable manner by the mechanism which effects operation of the spindle 55 and the shaft 14. If so desired, the carriage may be fed intermittently in the manner disclosed in the patent to Friederich Müller No. 1,429,617 dated September 19, 1922. The relieving movements of the tool may be effected in the manner disclosed in the patent to Friederich Müller No. 1,429,611 dated September 19, 1922, if so desired. Moreover, the variation in the blank rotation in accordance with the helicoidal cutting faces may be accomplished in the manner disclosed in the patent to Friederich Müller No. 1,429,617.

Modifications in the machine, and in the location and arrangement of parts may be made within the spirit and scope of our invention and such modifications are intended to be covered by the appended claims.

What we claim is:

1. In a relieving machine, the combination with means for rotating a blank, a cutting tool for engaging the blank, a movable support for the cutting tool, a former member having a contour similar in shape but different in size from the contour to be cut by the finished blank, a stationary support for the former member, and a former pin similar in shape to the cutting tool and differing in size therefrom according to the difference between the size of the former contour and the contour to be cut by the finished blank, said former pin being movable with the cutting tool and engaging the former member, of means controlled by the former pin and the former member for automatically operating the cutting tool to shape and relieve the teeth on the blank to cut a contour similar in shape to the contour of the former member but differing in size therefrom, said controlling means being jointly carried by the stationary support for the former member and the movable support for the cutting tool.

2. In a machine tool, the combination with means for rotating a blank, a cutting tool mounted on a movable support and adapted to engage the blank, a former member mounted on a stationary support and having a contour similar in shape to the contour to be cut by the finished blank, a pantograph mechanism jointly carried by the stationary support for the former member and the movable support for the cutting tool, and a former pin carried by said pantograph mechanism and adapted to engage the former member, of means controlled by the former pin, said mechanism and the former member for automatically shaping the blank to cut a contour similar in shape to the former contour but differing in size therefrom.

3. In a machine tool, the combination with means for rotating a blank having helical teeth, a cutting tool, a former member mounted on a stationary support, a carriage movable longitudinally with respect to the blank, a transversely movable slide mounted on said carriage and adapted to carry said cutting tool, a pantograph jointly carried by the support for the former member and the slide carrying the cutting tool, and a former pin mounted on said pantograph mechanism and adapted to engage the former member, said pin being so mounted on the pantograph mechanism as to move the tool in proportion to any movement by it when moved in accordance with the contour of the former member, of means controlled by the former pin and the pantograph mechanism in accordance with the contour of the former member for shaping the helical teeth on the blank to cut a contour similar in shape to the former contour but differing in size therefrom.

4. In a machine tool, the combination with means for rotating a blank, a cutting tool for engaging the blank, a former member having a predetermined contour, a former pin adapted to engage the former member, and control means for so connecting said pin to the cutting tool as to move the tool proportionally to any movement effected by the pin, of means for automatically operating the cutting tool under the control of the former pin, said control means and the former member to shape the blank to cut a contour similar in shape to the former contour but differing in size therefrom.

In testimony whereof, we hereto affix our signatures.

CARL SCHRAMM.
PAUL F. VOKAL.